United States Patent [19]
Hartmann

[11] 3,812,261
[45] May 21, 1974

[54] METHOD OF PRODUCING TRANQUILIZATION WITH DIOXOLANYL ALCOHOLS AND THEIR HALOGEN DERIVATIVES

[75] Inventor: Ludgwig A. Hartmann, Wilmington, Del.

[73] Assignee: ICI America Inc., Wilmington, Del.

[22] Filed: Mar. 28, 1972

[21] Appl. No.: 238,955

Related U.S. Application Data

[63] Continuation-in-part of Ser. No. 235,024, March 15, 1972, abandoned.

[52] U.S. Cl. ............................ 424/278, 260/340.9
[51] Int. Cl. ......................................... A61h 27/00
[58] Field of Search ................ 260/340.9; 424/278

[56] References Cited
UNITED STATES PATENTS

| | | | |
|---|---|---|---|
| 2,925,424 | 2/1960 | Simmons | 260/340.9 |
| 3,488,335 | 1/1970 | Braun | 260/340.9 |
| 3,324,144 | 6/1967 | Coe et al. | 260/340.9 |
| 3,337,408 | 8/1967 | McClure | 424/278 |
| 3,058,981 | 10/1962 | Avakia et al. | 260/247.7 |
| 3,121,094 | 2/1964 | Harran et al. | 260/340.9 |
| 3,597,435 | 8/1970 | Houbiha | 260/297 R |
| 3,547,951 | 12/1970 | Hardie et al. | 260/340.9 |
| 3,314,850 | 4/1967 | Gilbert | 424/278 |
| 3,475,456 | 10/1969 | Selman | 260/340.9 |
| 3,467,674 | 9/1969 | Brown | 260/349.9 |
| 2,260,261 | 10/1941 | Moray | 260/338 |
| 2,901,514 | 8/1959 | Drysdale | 260/615 |
| 2,911,414 | 11/1959 | Simmons | 260/327 |
| 3,246,012 | 4/1966 | Feits | 260/340.9 |
| 3,285,936 | 11/1966 | Gilbert et al. | 260/340.9 |
| 3,379,736 | 4/1968 | Dietrich et al. | 260/340.9 |
| 3,404,162 | 10/1968 | Selman | 260/340.9 |

FOREIGN PATENTS OR APPLICATIONS

697,590   4/1967   Belgium

OTHER PUBLICATIONS

Melson, Acta., Biol. Med. Germ. Vol. 8, pp. 381–386 (1862).
Chaldt et al., Acta. Biological Medical Germanica Vol. 15, pp. 79–88 (1965).
Boekelheide et al., Journal Amer. Chem. Soc., Vol. 71, pp. 3303–3307 (1949).
Toxicology and Applied Pharmacology, Vol. 18, pp. 69–82 (1971).
Hibbert et al., J. Am. Chem Soc., Vol. 45, 734–751 (1923).
Journ. Am. Chem. Soc., Vol. 82, 2288 (1960).
L. Yoder, J. Am. Chem. Soc., Vol. 45, 475–479 (1923).
Vystrcil & J. Vacek, Chem. Lesteg, Vol. 44, 204–210 (1950); Chem. Abst. 45, 7956a.
B. G. Yosnitskii, S. A. Sarkeseparts, and E. G. Ivanyak, Zhurval Obshchei Khimii, Vol. 34, 1940–1945 (1964).
G. M. Zareibenskii et al., Zharval Obshchei Khimii Vol. 35 (10) 1790–1798 (October 1965).
G. M. Zareibenskii et al.. Zharval Obshchei Khimii Vol. 36 (6) 1013–1017 (June 1966).
G. M. Zareibenskii et al., Zharval Obshchei Khimii, Vol. 35 (9) 1620–1625 (1965).
F. Melson, Acta, Biol. Med. Ger., Vol. 6, 395–406 (1961).
F. Melson, Acta, Biol. Med. Ger. Vol. 8, 381–38 (1962).
F. Melson, Arzneimettel–Forsch, Vol. 13, 23–26 (1963).

*Primary Examiner*—Stanley J. Friedman
*Attorney, Agent, or Firm*—Charles A. Haase

[57] ABSTRACT

A method of producing tranquilization in animals by administering an effective amount of a dioxolanyl alcohol or a 4- or 4,5-halogen derivative thereof is disclosed. All of the subject dioxolanyl compounds are also substituted in the 2-position with two perhalogenated alkyl groups.

11 Claims, No Drawings

METHOD OF PRODUCING TRANQUILIZATION WITH DIOXOLANYL ALCOHOLS AND THEIR HALOGEN DERIVATIVES

This application is a continuation-in-part of my copending U.S. application Ser. No. 235,024, filed Mar. 15, 1972, now abandoned entitled "METHOD OF PRODUCING TRANQUILIZATION WITH DIOXOLANYL ALCOHOLS AND THEIR HALOGEN DERIVATIVES."

This invention relates to a method of producing tranquilization in living animals, more particularly mammals, by administering a therapeutically effective amount of a dioxolanyl alcohol or a halogen derivative thereof.

The compounds which are used to produce tranquilization in accordance with the present invention are cyclic ketals of polyhydric alcohols which contain at least three hydroxyl groups and at least three carbon atoms, and ketones of the general formula

(1)

wherein each R is a perhalogenated alkyl radical. This group of compounds for convenience is referred to herein as dioxolanyl alcohols and are the hydroxyl derivatives of perhalogenated dioxolane compounds respectively. The 4- or 4,5-halogen derivatives of 4- or 4,5-hydroxyalkyl dioxolane are also useful in the present method of producing tranquilization.

Polyhydric alcohols within the above noted class include simple sugars and polyols. Examples of polyols are alkanetriols, alkanetetrols, alkanepentols and alkanehexols. More specifically, compounds such as sorbitol; mannitol; erythritol; xylitol,; glycerol; 2-methyl-2,3,4-pentanetriol; 1,2,3-butanetriol; 1,2,3,4-hexanetetrol; 2,3,4-hexanetriol; 1,2,3-hexanetriol; 1,2,4-hexanetriol; 1,3,4-heptanetriol; 1,2,4-pentanetriol; 1,2,3-heptanetriol; and 1,2,4-butanetriol; are considered within the class of polyhydric alcohols which contain at least three hydroxyl groups and at least three carbon atoms. A preferred group of polyhydric alcohols have from three to six carbon atoms and include for example, glycerol, sorbitol, threitol, erythritol, butanetriols and xylitol.

Ketones within formula (1) may, for example, include perhalogenated alkyl radicals of the general formula $C_nX_{2n+1}$ where $n$ is an integer from 1 to 7 and X is a halogen with an atomic weight of at most 80, preferably 36. The halogen content of said ketones can be a mixture of halogens.

Examples of these ketones are bis(trifluoromethyl) ketone; bis(chlorodifluoromethyl) ketone; chlorodifluoromethyl-dichlorofluoromethyl ketone; (bis(pentafluoroethyl) ketone; bis(dichlorotrifluoroethyl) ketone; 1,1,1-tribromo-3,3,3-trifluoropropanone; and 3,3-dibromo-1,1,1,3-tetrafluoroacetone.

A preferred class of cyclic ketals of this invention is based upon polyhydric alcohols having from three to six carbon atoms and from three to six hydroxyl groups, and ketones containing from three to about nine carbon atoms, the halogen having an atomic weight of at most 36 and the halogen content of any ketone can be a mixture of halogens. The preferred subclass of cyclic ketals is those formed from glycerol carbonate or butanetriol carbonates and perhalogenated acetone selected from the group consisting of hexafluoroacetone, chloropentafluoroacetone, dichlorotetrafluoroacetones, and trichlorotrifluoroacetones.

A group of cyclic ketals that can be used in the process of the present invention may be represented by the formula

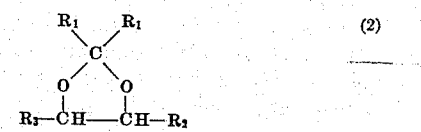
(2)

where each $R_1$ is an independently selected perhaloalkyl radical; $R_2$ and $R_3$ are independently selected from hydrogen, an alkyl radical, a haloalkyl radical, a hydroxyalkyl or polyhydroxyalkyl radical so as to contain combined a total of from one to five carbon atoms. In formula (2), $R_3$ and $R_2$ are chosen so that there is at least one free hydroxyl or haloalkyl group. When $R_2$ and/or $R_3$ is a haloalkyl radical, it is preferably a monohalo substituted alkyl radical wherein the halogen is selected from the group consisting of bromine, iodine, chlorine and fluorine.

In a subclass of the cyclic ketal of formula (2), each $R_1$ would be independently selected from perhaloalkyl radicals of from one to seven carbon atoms and contain halogen atoms having an atomic weight at most about 80. In a preferred species the subject perhaloalkyl radicals contain fluorine or chlorine atoms or any combination thereof. It is intended that the subject compounds can be substituted with perhalogenated alkyl groups containing mixed halogens such as for example, dichlorofluoromethyl groups which are symmetrical (meaning that both $R_1$ groups are identical), as well as perhalogenated alkyl groups which are unsymmetrical, e.g., 2-chlorodifluoromethyl-2-dichlorofluoromethyl. Obviously the subject $R_1$ group can also be unmixed perhalogenated alkyl groups which are either symmetrical or unsymmetrical. The $R_2$ and $R_3$ radicals of this class would be an alkyl radical, a haloalkyl radical, a hydroxyalkyl or polyhydroxyalkyl radical, or a hydrogen atom. Where $R_2$ and/or $R_3$ are haloalkyl radicals the halogen atoms have an atomic weight of at most about 127.

Examples of the cyclic ketals within this invention include among others: 2,2-bis(trifluoromethyl)-4-hydroxymethyl-1,3-dioxolane; 2-tribromomethyl-2-trifluoromethyl-4-hydroxymethyl-1,3-dioxolane; 2,2-bis(trifluoromethyl)-4-(4-hydroxybutyl)-1,3-dioxolane; 2,2-bis(trichloromethyl)-4-(1,2-dihydroxyethyl)-1,3-dioxolane; 2-dichlorotrifluoroethyl-2-tetrachlorotrifluoropropyl-4-hydroxymethyl-1,3-dioxolane; 2-trichlorodifluoroethyl-2-pentachlorotetrafluorobutyl-4-hydroxymethyl-1,3-dioxolane; 2-heptafluoropropyl-2-pentafluoroethyl-4-hydroxymethyl-5-(1,2-dihydroxyethyl)-1,3-dioxolane; 2,2-bis(trifluoromethyl)-4-(2-hydroxyethyl)-1,3-dioxolane; 2,2-bis(chlorodifluoromethyl)-4-chloromethyl-1,3-dioxolane; 2,2-bis(chlorodifluoromethyl)-4(5-hydroxypentyl)-1,3-dioxolane; and 2,2-bis(trifluoromethyl)-4-chloromethyl-1,3-dioxlane.

To further illustrate the cyclic ketals within this invention the following formulae are given:

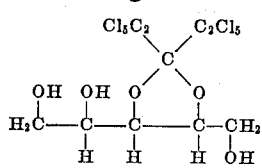

(3)

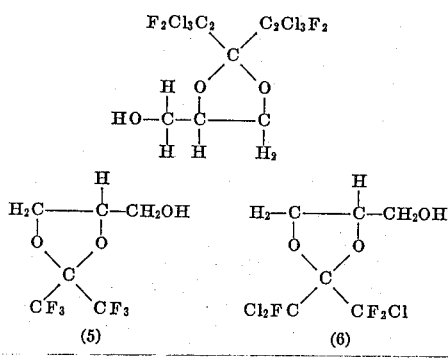

(4)

(5) (6)

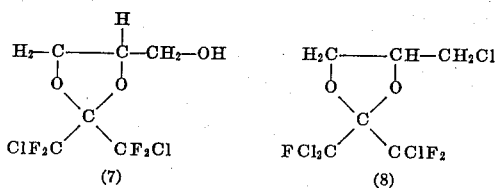

(7) (8)

In the preparation of the compounds used in the method of this invention the cyclic ketals described above except where $R_2$ and/or $R_3$ in formula (2) is a haloalkyl radical may be prepared directly by heating a ketone, within formula (1) above, with a cyclic carbonate of a polyhydric alcohol, which polyhydric alcohol contains at least three hydroxyl groups and three carbon atoms, and which cyclic carbonate contains one or more cyclic carbonate groups. When said cyclic carbonate contains no free hydroxyl groups the reaction is carried out in the presence of a lower alcohol or water. The mol ratio of ketone to cyclic carbonate may be as high as about 10 mols of ketone per cyclic carbonate group. Where a lower alcohol is used a sufficient quantity for dissolving the cyclic carbonate is employed. Alternately, the cyclic ketals may be prepared by reacting a lower alcohol or water with a ketone within formula (1) above, forming a hydrate or a hemiketal respectively, and subsequently reacting this product with a cyclic carbonate described above. Where a cyclic carbonate containing more than one carbonate group is reacted products may be formed containing both carbonate and ketal rings.

More particularly, a hydroxyl bearing cyclic carbonate of a polyhydric alcohol may be reacted with a ketone within formula (1) above in a two step reaction to form the cyclic ketal. The first step of the reaction forms an intermediate product which is a hemiketal of the ketone. This reaction may be initiated at temperatures as low as about 10°C. or as high as about 120°C. As the temperature falls below 10°C. initiation and reaction will become more difficult, as the temperature exceeds 120°C. the reaction proceeds progressively poorer and loss of the intermediate product results. The final reaction step is mostly an intramolecular reaction where the hemiketal function attached to said cyclic carbonate reacts with a carbonate group to form the cyclic ketal. This step, depending upon the reactants, will usually take at least one hour. The temperatures for this step are generally from 100°C. to about 170°C. As the temperature falls below 100°C. the reaction becomes sluggish; as the temperature rises above 170°C. loss of yield and reactants will start to occur.

An alternate process which yields equally good product and does not require the cyclic carbonate to also contain a free hydroxyl group, starts by reacting a ketone within formula (1) with a lower alcohol to form a hemiketal or with water to form a hydrated ketone. This reaction occurs at temperatures from about 10°C. to about 120°C. Then the product, namely the hydrate or hemiketal is reacted with a cyclic carbonate at from about 100°C. to about 170°C. to form the cyclic ketal; as in the above process the temperature ranges are chosen to optimize the reaction. Naturally if a suitable hemiketal or hydrate is available the formation step can be ommitted and it can be directly reacted with the carbonate.

In a preferred method of preparing these ketals the ols of ketone per cyclic carbonate group are from about 0.3 to about 3, the cyclic carbonate used contains up to about three cyclic carbonate groups and at least one free hydroxyl group. The temperature is maintained at 25°–70°C. for from 0.5 to 30 hours and then raised to 120°–160°C. until carbon dioxide is no longer being evolved.

Among the lower alcohols which may be used are saturated aliphatic monohydric alcohols, saturated aliphatic diols, and saturated aliphatic triols, wherein the aliphatic chain contains up to four carbon atoms. Examples are: ethanol, 1,2-butanediol, methanol, 1,2,3-butanetriol.

Examples of carbonates which can be used are: tetritol mono and biscyclic carbonates, glycerol cyclic carbonate, hexitol mono, bis and triscyclic carbonates, hexanetetrol mono and biscarbonate, butanetriol cyclic carbonate and heptanetriol cyclic carbonate.

So that those skilled in the art may more easily understand the synthesis of the compounds used in the method of this invention, the following non-limiting examples are presented. All percentages in the examples are by weight unless otherwise indicated.

EXAMPLE 1

118 grams glycerol carbonate (1 mole) is placed in a 500 ml three neck flask, fitted with a thermometer, magnetic stirrer, gas-inlet tube, and a condenser cooled with a dry ice-isopropyl alcohol bath. Hexafluoroacetone gas is added to the vigorously stirred glycerol carbonate at 27° – 60°C. until 142 grams (0.85 moles) has been absorbed. The dry ice condenser is now replaced by a water condenser which is connected to a dry ice trap so that hexafluoroacetone which escapes during reaction may be condensed. The temperature is raised slowly to about 188°C. at which point $CO_2$ evolution begins. The temperature is allowed to rise to 148°C. during a 40 hour reaction period. The resulting product is mixed with water (50 ml) and the organic layer separated and diluted with chloroform. The chloroform solution is washed several times with water and 5% NaHCO$_3$ solution. Vacuum stripping gives crude 2,2-bis(trifluoromethyl)-4-hydroxymethyl-1,3-dioxolane. This is distilled at 78° – 80°C./25 mm Hg and the yield of pure product is 92 percent, based on utilized hexafluoroacetone. The twice distilled product has a refractive index of 1.35046 (20°C.) and upon analysis contained 47.19 percent fluorine, 30.02 percent carbon, and 2.22 percent hydrogen.

EXAMPLE 2

In accordance with the procedure of Example 1, 41.8 grams of ethylene glycol (glycerol carbonate is replaced with ethylene glycol) is reacted with 54 grams of hexafluoroacetone at 26°–35°C. for 4 hours and yields 95.8 grams of product.

8.5 grams of this hydroxyethyl hemiketal of hexafluoroacetone is then reacted with 3 grams of glycerol carbonate at 115°–141°C. for 103 hours. The yield was 66 percent 2,2-bis(trifluoromethyl)-4-hydroxymethyl-1,3-dioxolane.

EXAMPLE 3

14.8 grams of absolute ethanol is reacted according to the procedure of Example 1, (glycerol carbonate is replaced with absolute ethanol) at 26°–35°C. with 57.5 grams of hexafluoroacetone for 6 hours. This product is then degassed at 30°C. and 100–150 mm mercury (absolute) for an additional 1.5 hours. This product is the ethyl hemiketal of hexafluoroacetone.

5.3 grams of the hemiketal product is mixed with 2.95 grams of glycerol carbonate and heated at 110° – 118°C. for 21 hours or until a gas-liquid chromatographic analysis shows a 50 percent yield of the ketal product. The product is then separated by extraction with 20 ml of chloroform and then is washed three times with 5 ml of a 7.0 percent bicarbonate solution and once with water. 4 grams of the product are obtained by vacuum stripping of the chloroform at 50°C.

The product, 2,2-bis(trifluoromethyl)-4-hydroxymethyl-1,3-dioxolane, is then distilled at 70°–75°C. and 20 mm Hg absolute and has a refractive index of 1.34988 at 20°C.

EXAMPLE 4

1.34 grams of sorbitol dicarbonate is dissolved in 3.5 grams of the hemiketal product of Example 3. This mixture is reacted at 105°C. for 24 hours and the clear liquid phase is decanted from the reaction mixture.

A yield of 1.04 grams product is obtained after vacuum stripping of the decanted solution at 50° – 90°C. and 15 mm Hg absolute. The product is soluble in acetone and chloroform and its analysis shows it to contain 36.3 percent carbon 3.91 percent hydrogen, and 20.4 percent fluorine. The product is a monoketal: cyclic-monocarbonate of sorbitol.

EXAMPLE 5

5.2 grams of mannitol tricarbonate and 23 grams of ethylene glycol hemiketal of hexafluoroacetone are reacted for 70 hours at 139°–142°C., under reflux. The reaction mixture is then cooled to 80°–90°C. and 5 ml of water is stirred in. An additional 7 ml of water is added and the mixture extracted five times with 25 ml. portions of chloroform to yield a water fraction and a chloroform fraction. Evaporation of the chloroform yields 2.59 grams of product.

The evaporation product is further refined by distillation at 80°–105°C. and 0.5 mm. of Hg absolute yielding 2.0 grams of a colorless syrup. After extraction of a small amount of residual ethylene glycol with water the product, predominantly mannitol monocarbonate monoketal, has the following analysis: 33.52 percent carbon, 3.19 percent hydrogen and 38.35 percent fluorine.

The water fraction from the first separation is vacuum stripped with final conditions of 140°–150°C. at 0.5 mm. Hg, absolute. The residue, 3.21 grams of a viscous syrup, is dissolved in 7 ml of acetone from which 0.56 grams of solid is filtered. The acetone is then evaporated and the product is distilled at 140°–175°C. and 0.3 mm of Hg absolute. The product, 1.16 grams of predominantly mannitol monoketal, has the following analyses: 38.28 percent of carbon, 5.16 percent of hydrogen and 25.35 percent of fluorine.

EXAMPLE 6

86.7 grams of dichlorotetrafluoroacetone is added dropwise to 50.7 grams of glycerol carbonate at 27°–35°C. while cooling is applied. The product is stirred at 35°C. for 1 hour. 50 ml additional glycerol carbonate is added and the temperature is raised to 115°–123°C. CO$_2$ evolution then starts and the temperature is raised to 150°–170°C. for a total period of 42 hours. The product is isolated according to Example 1 and is found to be a liquid, distilling at 119°–121°/20 mm. The refractive index is 1.41844 at 20°C. Analysis shows: hydroxyl number 190, 26.47 percent carbon, 2.57 percent hydrogen, 26.0 percent chlorine, and 27.5 percent fluorine. The product is 2,2-bis(chlorodifluoromethyl)-4-hydroxymethyl-1,3-dioxolane.

EXAMPLE 7

Cyclic carbonate of 1,2,4-butanetriol (38.4 grams) is treated with 57.9 grams of dichlorotetrafluoroacetone at 25°–40°C. The product is then reacted under reflux at 129°C. for 114 hours after 8 grams butanetriol has been added to provide a higher reaction temperature. The product isolated according to Example 1 is principally 2,2-bis(chlorodifluoromethyl)-4-(2-hydroxyethyl)-1,3-dioxolane and distills at 73°–81°C./0.15 mm and has a refractive index of 1.42180 at 20°C. Analysis shows: 29.3 percent carbon, 2.95 percent hydrogen, 25.0 percent fluorine, and 23.0 percent chlorine.

EXAMPLE 8

Glycerol carbonate (35.4 grams) is treated with 76 grams trichlorotrifluoroacetone dropwise at 26°–40°C. The hemiketal intermediate is diluted with additional glycerol carbonate (total carbonate present was 115.4 grams) and heated under reflux while the temperature gradually rises. Reaction time is 40 hours at 110°–123°C. and 48 hours at 123°–143°C. Weight loss is about 20 grams during that time. The isolated product is 2-chlorodifluoromethyl-2-fluorodichloromethyl-4-hydroxymethyl-1,3-dioxolane, found to distill at 92°C./0.20 mm and have a refractive index of 1.44885 at 20°C.

EXAMPLE 9

0.66 grams of solid hexafluoroacetone monohydrate, obtained by bubbling hexafluoroacetone through distilled water, is added to 1.05 grams of glycerol cyclic carbonate and is then reacted at 100°–111°C. for 64 hour. The reaction product is 2,2-bis(trifluoromethyl)-4-hydroxymethyl-1,3-dioxolane.

EXAMPLE 10

11.8 grams of glycerol carbonate is mixed with 36.2 grams of bis(trichlorodifluoroethyl) ketone and heated at 55°C. for 30 hours.

The reaction mixture temperature is then increased to 125°C. and reacted for an additional 25 hours. The product is predominantly 2,2-bis(trichlorodifluoroethyl)-4-hydroxymethyl-1,3-dioxolane.

Another general method of preparing the subject dioxolanyl alcohol compounds is disclosed in U.S. Pat. No. 2,925,424. This method is based on reacting glycol half esters, e.g., chlorohydrins, with perhalogenated ketones in the presence of base.

Compounds, e.g., halohydrins, pertinent to the present invention may be obtained from olefinic alcohols by reaction with hypochlorite, as illustrated by the method described in Bull. Soc. Chim. France, 1962 (177–182) or by reaction with N-bromosuccinimide by known method. Among olefinic alcohols which can thus be converted to chlorohydrins suitable as starting materials for the present invention, are the following: 2-methyl-2-propen-1-ol; 3-buten-1-ol; 4-penten-1-ol; 4-penten-2-ol; 3-methyl-3-buten-1-ol; 3-methyl-3-buten-2-ol; 5-hexen-1-ol; 5-hexen-3-ol; 4-methyl-4-penten-2-ol; 2,3-dimethyl-3-buten-2-ol; 6-heptene-3-ol; 2-methyl-5-hexen-2-ol; and 2,3-dimethyl-4-penten-2-ol.

The immediately above described general method of preparing the subject hydroxyl substituted cyclic ketals is illustrated by reaction step III of Example 11. Steps I and II of Example 11 illustrate an alternative method that can be used to prepare the desired chloroalkanediol.

EXAMPLE 11

Preparation of 2,2-bis(trifluoromethyl)-4(2-hydroxyethyl)-1,3-dioxolane

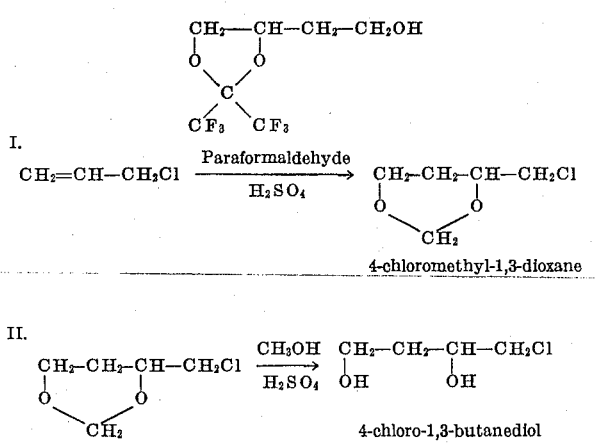

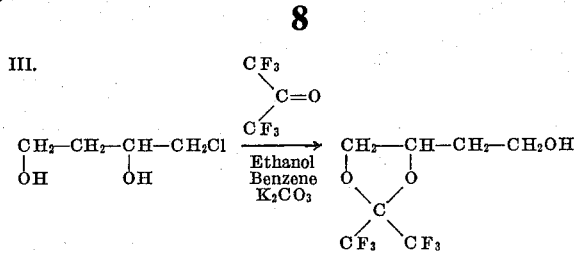

4-chloromethyl-1,3-dioxane was made in about 25 percent yield by a method given in the literature [C. C. Price, et al., J. Am. Chem. Soc. 72, 5335–5336 (1950)]. Because the intermediate 4-chloro-1,3-butanediol was expected to be unstable, reactions II and III above were carried out in one step without isolation of the 4-chloro-1,3-butanediol. Details of the above illustrated procedure are as follows:

A sample of 27.4 grams of 4-chloromethyl-1,3-dioxane (0.2 mols) is dissolved in 100 ml methanol and 3.6 grams concentrated sulfuric acid is added. The solution is boiled and thereby concentrated to one-half volume. This is repeated several times until hydrolysis is complete. The solvent is then evaporated at atmospheric pressure, 60 ml benzene added and the mixture stirred magnetically. Adduct of hexafluoroacetone/ethanol, containing 0.8 gram hexafluoroacetone per gram, is then added (52 grams = 0.225 mols), followed by 26.0 grams potassium carbonate (0.19 mols). The mixture is stirred at room temperature for 48 hours. The product is partitioned with the aid of 100 ml water and 40 ml benzene. The aqueous phase is extracted two times with 50 ml each of benzene and the benzene phases combined. The benzene phase is washed three times with 50 ml 5 percent sodium carbonate solution and three times with 100 ml of water. Benzene is evaporated under moderate vacuum at 40°–50°C. and 27.3 grams product (53.7 percent yield) is obtained. The product, 2,2-bis(trifluoromethyl)-4-(2-hydroxyethyl)-1,3-dioxolane is distilled at 94°–96°C./18 mm Hg. Yield of distilled product is 45 percent. The refractive index is 1.36053 (20°C.). Analysis of twice distilled product is as follows:

| Found | | | Calculated | |
|---|---|---|---|---|
| C | 33.18% | | 33.08% | |
| H | 3.44% | | 3.17% | |
| F | 44.40% | | 44.86% | |

Purity was checked by gas liquid chromatography and thin layer chromatography (100 percent). Structure was confirmed by mass spectrometry.

The compounds represented by formula (2) above wherein $R_2$ and/or $R_3$ is haloalkyl can be prepared from the corresponding dioxolanyl alcohol or hydroxyl substituted cyclic ketals described above and exemplified in Examples 1 to 11 by several different reactions. When $R_2$ and/or $R_3$ is chloroalkyl the following general reaction is applicable using an equal mol weight of pyridine and a slight mol excess of thionyl chloride at about 10°C. The reaction is completed by raising the temperature to 100°C.

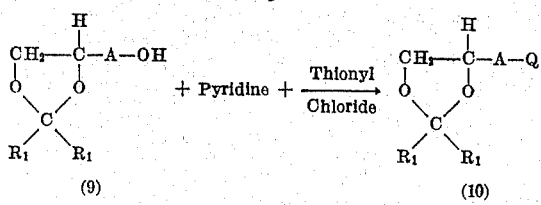

A in the above formulas is a linear or non-linear lower alkylene radical containing from one to five carbon atoms, Q is chlorine, and $R_1$ is as defined above in relation to formula (2). The product (10) is purified by aqueous extraction and vacuum distillation.

To prepare the subject dioxolane compounds where Q in formula (10) above is iodo or fluoro it is advantageous to go through the tosylate derivative of a suitable dioxolane compound. For example, a sample of 2,2-bis(chlorodifluoromethyl)-4-p-toluene-sulfonyloxymethyl-1,3-dioxolane is dissolved in four parts dimethyl acetamide and treated 24 hours with an excess potassium fluoride at about 150°C. The product is isolated by filtration and vacuum distillation. The iodo derivative [this is when Q in formula (10) is iodine] can be prepared, for example, by dissolving a suitable dioxolane tosylate derivative in acetone and heating for 24 hours at 100°C. with an excess sodium iodide. The resulting product is then filtered and vacuum distilled. Another solvent that can be used in the above reaction is, for example, dimethyl formamide.

The above required tosylate compounds can be prepared by the following general method:

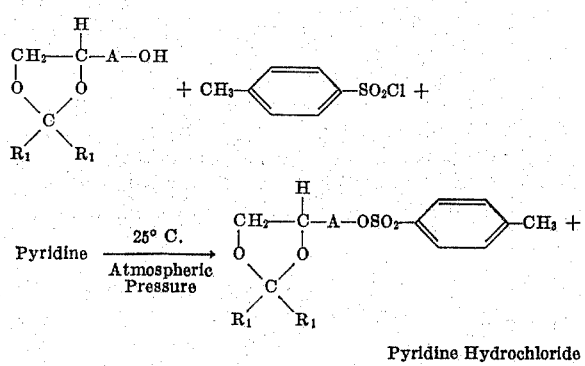

A, and $R_1$ are as identified above in relation to formula (9).

When Q in formula (10) is bromine it can be prepared by treatment of a suitable dioxolanyl alcohol with an excess H Br at elevated temperature (60°–100°C.). The resulting product is purified by aqueous extraction and vacuum distillation.

It will be obvious to those skilled in the present art that the above-described method of preparing the subject 4-substituted perhalogenated dioxolane compounds is also directly applicable to the preparation of the 5-haloalkyl and 4,5-bis(haloalkyl) substituted dioxolanes by simple replacement of the initial dioxolane reactant and obvious adjustment of the mol concentration of reactants so as to provide for mono or di-substitution. For example, a suitable 5-hydroxyalkyl substituted perhalogenated dioxolane or 4,5-bis(hydroxyalkyl) substituted perhalogenated dioxolane can be used as the initial reactant where indicated.

The following Examples 12 to 14 will further illustrate the preparation of the subject compounds containing a haloalkyl group in the four-position.

EXAMPLE 12

2,2-Bis(Trifluoromethyl)-4-Chloromethyl-1,3-Dioxolane

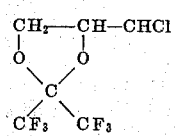

Commercial glycerol-1,2-dichlorohydrin is purified by distillation (b.p. 80°C./20 mm Hg). A sample of 25.5 grams (0.2 mols) is treated with hexafluoroacetone at 30°–40°C. until 28.5 grams is picked up (86 percent of theory). Potassium carbonate (0.2 mols) and 120 ml hexane is added at 30°C. and the reaction mixture stirred vigorously at room temperature for 16 hours. The product is mixed with water and the aqueous phase extracted with hexane. The hexane solution is washed with water and vacuum-stripped. 12.6 Grams of colorless liquid product is obtained. The product is distilled at 51°–53°C./22 mm Hg to yield 2,2-bis(trifluoromethyl)-4-chloromethyl-1,3-dioxolane.
Analysis: (In Percent) C, 27.52; H, 2.14; Cl, 13.93; F, 43.75.
Calculated for $C_6H_5ClF_6O_2$ (M.W. 258.6); C, 27.87; H, 1.95; Cl, 13.71; F, 44.09.

EXAMPLE 13

2-Chlorodifluoromethyl-2-Dichlorofluoromethyl-4-Chloromethyl-1,3-Dioxolane

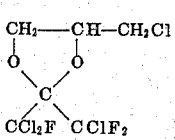

A sample of 6.0 grams 2-chlorodifluoromethyl-2-dichlorofluoromethyl-4-hydroxymethyl-1,3-dioxolane (0.021 mols) is mixed with 1.9 grams pyridine (0.024 mols) and treated with 2.8 grams thionyl chloride (0.024 mols) dropwise at 0°–8°C. After a period of 16 hours at 25°C. the temperature is raised to 90°–105°C. for about 6 hours. The reaction product is dissolved in 35 ml benzene and the solution washed with several portions of 10 ml water and 3 percent sodium carbonate. Vacuum-stripping of the solvent gives 5.8 grams crude product (91 percent). Fractional distillation at 72°C./1.0 mm Hg gives 3.3 grams of 2-chlorodifluoromethyl-2-dichlorofluoromethyl-4-chloromethyl-1,3-dioxolane.
Analysis: (In Percent) C, 23.74; H, 2.06; Cl, 45.82; F, 18.56.

Calculated for $C_6H_5Cl_4F_3O_2$ (M.W. 275.90): C, 23.40; H, 1.64; Cl, 46.05; F, 18.51. Refractive index: 1.45088 (20°C.)

EXAMPLE 14

1. 2,2-Bis(Chlorodifluoromethyl)-4-Chloromethyl-1,3-Dioxolane

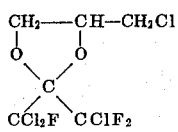

A sample of 6.0 grams of 2,2-bis(chlorodifluoromethyl)-4-hydroxymethyl-1,3-dioxolane (0.022 mols) is mixed with 1.9 grams pyridine (0.024 mols) and treated with 2.8 grams thionyl chloride (0.024 mols) at 0°–10°C. After a period of 16 hours at 25°C. the temperature is raised to 90°–105°C. for about 6 hours. The reaction mixture is dissolved in 35 ml benzene and washed with several portions of 10 ml water and 3 percent sodium carbonate. Vacuum-stripping and distillation at 53°C./1.1 mm Hg yields 3.6 grams of 2,2-bis(chlorodifluoromethyl)-4-chloromethyl-1,3-dioxolane.

2. Analysis: (In Percent) C, 24.53; H, 2.06; Cl, 36.36; F, 26.28.

Calculated for $C_6H_5Cl_3F_4O_2$ (M.W. 291.45): C, 24.73; H, 1.73; Cl, 36.9; F, 26.08. Refractive index: 1.41856 (20°C.)

U.S. Pat. No. 3,488,335, issued Jan. 6, 1970, also discloses a method of preparing 4-hydroxymethyl substituted dioxolane compounds which are useful in the present method of producing tranquilization. This patent discloses compounds coming within the structure

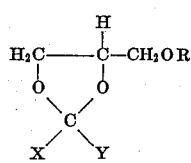

wherein X and Y can be perfluoroalkyl or perchlorofluoroalkyl, both of one through five carbon atoms and R is hydrogen. Illustrative of the perchlorofluoroalkyl radicals in the X and Y positions are
— $CF_2Cl$
— $CCl_2F$
— $CF_2CF_2Cl$ The preparation of several 4-haloalkyl and 4,5-bis(haloalkyl) substituted dioxolanes coming within the present description and suitable for use in the present process are also disclosed in U.S. Pat. No. 2,925,424 and U.S. Pat. No. 3,324,144.

Various test procedures are used in the laboratory to test for tranquilizer activity. Among those tests used are the "Shock-Induced Aggression Test" and "The Amphetamine Toxicity Antagonism Test" which can be carried out as follows:

3. Shock-Induced Agression (Mice)

In this procedure, two mice are placed on a grid, and the grid is electrified for two minutes. This induces the animals to engage in aggressive behavior toward each other. The amount of time spent fighting by each pair of control mice (injected with water) is compared to the amount of time spent fighting by pairs injected with the test drug. Drugs are administered orally. Tranquilizers lower fighting time by reducing aggressiveness.

Results: The compound, 2,2-bis(chlorodifluoromethyl)-4-chloromethyl-1,3-dioxolane, reduced fighting time by 83 percent at 200 mg/kg, and by 29 percent at 25 mg/kg.

4. Amphetamine Toxicity Antagonism (Mice

In this test, ten mice are injected orally with either water (controls) or a test drug, and 1 hour later are injected intraperitoneally with amphetamine. The dose of amphetamine is one which causes death in 80–100 percent of control mice, by over-stimulating the sympathetic nervous system. At 2 and 4 hours after amphetamine injection, the number of animals remaining alive in each group is compared.

Results: The compound, 2,2-bis(chlorodifluoromethyl)-4-chloromethyl-1,3-dioxolane, reduced amphetamine toxicity by 100 percent at 200 mg/kg, and gave 50 percent protection at 25 mg/kg.

Evaluation in laboratory animals indicate that the present dioxolane compounds possess tranquilizer activity. More particularly they appear to act as minor tranquilizers.

In accordance with the present method of producing tranquilization the effectiveness and dosage required will vary, as is customary in this art, with the species being treated, the particular disorder being treated, the weight of the animal and the route of administration. An appropriate dose or therapeutically effective amount and method of administration suitable for any animal susceptible to these compounds may be readily found as a simple routine determination. In the method of this invention, the subject compounds are administered at doses from about 1.0 milligram to 500 milligrams per kilogram body weight one to four times a day. As indicated above, desirably effective dosage will vary depending upon the species of animal and other above-stated variables. For example, a preferred oral dose range for mice of 2,2-bis(trifluoromethyl)-4-hydroxymethyl-1,3-dioxolane and 2,2-bis(chlorodifluoromethyl)-4-hydroxymethyl-1,3-dioxolane is from about 200 to 300 milligrams per kilogram of body weight. A preferred dose range for rats of 2,2-bis(dichlorofluoromethyl)-4-chloromethyl-1,3-dioxolane is from about 300 to 400 milligrams per kilogram body weight by intraperitoneal injection. Further, a preferred dose range for rats of 2-chlorodifluoromethyl-2-dichlorofluoromethyl-4-hydroxymethyl-1,3-dioxolane is from about 180 to 300 milligrams per kilogram body weight by intraperitoneal injection.

As the compounds within the scope of this invention are effective upon oral administration they can be compounded in any suitable oral dosage form as in tablet, capsule, syrup, elixir, suspension or other solid or liquid forms that can be prepared by procedures well known in the art. Thus, the subject novel compounds can be mixed with a suitable diluent such as lactose or kaolin and encapsulated; or they can be combined with suitable binding agents and expanding agents and compressed in tablets. In addition a liquid pharmaceutical may be obtained by dissolving or suspending novel compounds of this invention with a suitable flavored liquid. The present compounds are also considered active upon parenteral and rectal administration.

Examples of formulation for preparing tablets, capsules, liquids, parenterals and suppositories containing the novel dioxolane compounds of the present invention are described below. Obviously, it will be recognized by one skilled in the present art that the following formulations represent only one method for preparing such pharmaceutical compositions and obviously the size of the tablet or capsule or the strength of the dosage form may be suitably varied in order to satisfy the particular requirements such as dosage level indicated. For example, each dosage unit may conveniently contain from about 15 mg to 5,000 mg of the active ingredient admixed with a diluent amount of a pharmaceutically acceptable carrier. Any of the well known suitable pharmaceutical carriers can be used to provide acceptable dosage forms so as to provide an effective amount of therapeutically effective amount of the compound to be administered.

| Tablet Containing 100 mg of 2,2-Bis(Trifluoromethyl)-4-hydroxymethyl-1,3-Dioxolane | 1000 Tablets (Grams) |
|---|---|
| 2,2-Bis(Trifluoromethyl)-4-hydroxymethyl-1,3-Dioxolane | 100 |
| Starch | 80 |
| Powdered Lactose | 80 |
| Talc | 20 |
| Weight of granulation | 280 |

Combine all ingredients, mix and then compress into slugs. The slugs should then be ground to form granules that will pass through a 14–16 mesh screen. The granules may then be recompressed into tablets using a suitable compression mold to form tablets, each weighing 280 mg.

| Capsule Containing 200 mg of 2,2-Bis(Trifluoromethyl)-4-hydroxymethyl-1,3-Dioxolane | |
|---|---|
| 2,2-bis(trifluoromethyl)-4-hydroxymethyl-1,3-dioxolane | 200 mg |
| Powdered Lactose | 100 mg |
| D.T.D. Capsules No. 1000 | |

Mix the ingredients so as to evenly distribute the active ingredient through the lactose. Pack the powder into No. 1 empty gelatin capsule.

| Suspension Containing 50 mg per 5 cc of 2,2-Bis(Chlorodifluoromethyl)-4-Hydroxymethyl-1,3-Dioxolane | |
|---|---|
| 2,2-Bis(Chlorodifluoromethyl)-4-Hydroxymethyl-1,3-Dioxolane | 10 grams |
| Tragacanth | 50 grams |
| Amaranth | 10 grams |
| Syrup Wild Cherry | 60 ml |
| Distilled Water q.s. | 1000 ml. |

Hydrate the tragacanth with sufficient water to form a smooth paste and to this add the 2,2-bis(chlorodifluoromethyl)-4-hydroxymethyl-1,3-dioxolane, followed by the amaranth which has been previously dissolved in water. Then add the syrup of wild cherry and add distilled water to make 1,000 ml.

| Injectable Containing 5 mg of 2,2-Bis(Chlorodifluoromethyl)-4-Hydroxymethyl-1,3-Dioxolane Per Milliliter Suitable for Intramuscular, Intraperitoneal or Subcutaneous Injection | |
|---|---|
| 2,2-Bis(Chlorodifluoromethyl)-4-Hydroxymethyl-1,3-Dioxolane | 5.0 grams |
| Chlorobutanol | 3.0 grams |
| Propylene Glycol | 20.0 ml |
| Water for injection q.s. | 1000.0 ml |

Combine the above ingredients, clarify by filtration, fill into vials, seal and autoclave.

| Suppository Containing 200 mg of 2-Chlorodifluoromethyl-2-Dichlorofluoromethyl-4-Hydroxymethyl-1,3-Dioxolane | |
|---|---|
| 2-Chlorodifluoromethyl-2-dichlorofluoromethyl-4-Hydroxymethyl-1,3-Dioxolane | 0.2 gram |
| Cocoa Butter | 1.8 grams |
| Make of such No. 100 | |

Melt the cocoa butter and disperse the 2-chlorodifluoromethyl-2-dichlorofluoromethyl-4-hydroxymethyl-1,3-dioxolane in the molten mass and stir until uniform. Pour the resulting molten mass into suppository mold and chill. Remove suppositories from mold and package.

What is claimed is:

1. A method of tranquilizing an animal comprising administering to an animal a therapeutically effective amount of a compound represented by the formula

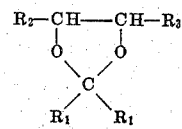

wherein each $R_1$ is an independently selected perhalogenated alkyl radical, $R_2$ and $R_3$ are independently selected from the group consisting of hydrogen, haloalkyl, alkyl, hydroxyalkyl or polyhydroxyalkyl so as to contain combined a total of from one to five carbon atoms, with the proviso that $R_2$ and $R_3$ are chosen so that there is at least one hydroxyl group or haloalkyl group.

2. A method of claim 1 wherein the compound is 2,2-bis(trifluoromethyl)-4-hydroxymethyl-1,3-dioxolane.

3. A method of claim 1 wherein the compound is 2,2-bis(chlorodifluoromethyl)-4-hydroxymethyl-1,3-dioxolane.

4. A method of claim 1 wherein the compound is 2-chlorodifluoromethyl-2-dichlorofluoromethyl-4-hydroxymethyl-1,3-dioxolane.

5. A method of claim 1 wherein the compound is 2,2-bis(trichlorodifluoroethyl)-4-hydroxymethyl-1,3-dioxolane.

6. A method of claim 1 wherein the compound is 2,2-bis(trifluoromethyl)-4-chloromethyl-1,3-dioxolane.

7. A method of claim 1 wherein the compound is 2-chlorodifluoromethyl-2-dichlorofluoromethyl-4-chloromethyl-1,3-dioxolane.

8. A method of claim 1 wherein the compound is 2,2-bis(chlorodifluoromethyl)-4-chloromethyl-1,3-dioxolane.

9. A method of claim 1 wherein the compound is 2,2-bis(trifluoromethyl)-4-(2-hydroxyethyl)-1,3-dioxolane.

10. A tranquilizer composition comprised of from about 15 to 5,000 mg of a compound of the formula

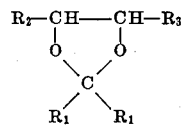

wherein each $R_1$ is an independently selected perhalogenated alkyl radical, $R_2$ and $R_3$ are independently selected from the group consisting of hydrogen, haloalkyl, alkyl, hydroalkyl or polyhydroxyalkyl so as to contain combined a total of from one to five carbon atoms, with the proviso that $R_2$ and $R_3$ are chosen so that there is at least one free hydroxyl group or haloalkyl group, in a pharmaceutical carrier.

11. A method of tranquilizing an animal which comprises administering to an animal a therapeutically effective amount of a composition of claim 10 to an animal susceptible thereto.

* * * * *

PO-1050
(5/69)

UNITED STATES PATENT OFFICE
CERTIFICATE OF CORRECTION

Patent No. 3,812,261　　　　　Dated May 21, 1974

Inventor(s) Ludwig A. Hartmann

It is certified that error appears in the above-identified patent and that said Letters Patent are hereby corrected as shown below:

Title page, column 1, "[75] Inventor: Ludgwig A. Hartmann, Wilmington," should read --[75] Inventor: Ludwig A. Hartmann, Wilmington,--.

Signed and sealed this 1st day of October 1974.

(SEAL)
Attest:

McCOY M. GIBSON JR.
Attesting Officer

C. MARSHALL DANN
Commissioner of Patents